US010256953B2

(12) United States Patent
Lee et al.

(10) Patent No.: US 10,256,953 B2
(45) Date of Patent: Apr. 9, 2019

(54) APPARATUS AND METHOD OF TRANSMITTING AND RECEIVING REFERENCE SIGNAL IN WIRELESS COMMUNICATION SYSTEM USING MULTIPLE-INPUT AND MULTIPLE-OUTPUT

(71) Applicant: Samsung Electronics Co., Ltd., Gyeonggi-do (KR)

(72) Inventors: Keonkook Lee, Gyeonggi-do (KR); Chanhong Kim, Gyeonggi-do (KR); Taeyoung Kim, Gyeonggi-do (KR); Jiyun Seol, Gyeonggi-do (KR); Jaeseung Son, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 279 days.

(21) Appl. No.: 14/631,613

(22) Filed: Feb. 25, 2015

(65) Prior Publication Data
US 2015/0244509 A1 Aug. 27, 2015

(30) Foreign Application Priority Data
Feb. 25, 2014 (KR) ........................ 10-2014-0021719

(51) Int. Cl.
H04J 11/00 (2006.01)
H04L 5/00 (2006.01)
(Continued)

(52) U.S. Cl.
CPC ............ H04L 5/0048 (2013.01); H04L 5/005 (2013.01); H04L 5/0023 (2013.01);
(Continued)

(58) Field of Classification Search
CPC .......................... H04B 7/0417; H04L 5/0048
(Continued)

(56) References Cited

U.S. PATENT DOCUMENTS 8,989,114 B2* 3/2015 Kim ........................ H04B 7/024
370/329
9,185,570 B2* 11/2015 Park ..................... H04B 7/0626
(Continued)

FOREIGN PATENT DOCUMENTS

KR 10-2011-0103617 9/2011

OTHER PUBLICATIONS

International Search Report dated Apr. 30, 2015 in connection with International Patent Application No. PCT/KR2015/001751, 3 pages.

Primary Examiner — Dmitry Levitan

(57) ABSTRACT

An apparatus and method is proved that transmits and receives Reference Signals (RSs) in a wireless communication system using Multiple-Input and Multiple-Output (MIMO). A system adapted to the method is provided. The method includes: determining the number of RS transmission to two or more antennas, respectively, as the number of antennas included in respective ports, wherein each port include one or more antennas; creating transmit patterns so that they cyclically differ from each other every the number of RS transmission to transmit the created transmit patterns the number of RS transmission times; and mapping the RSs to one or more antennas according to the created, respective patterns, and transmitting the RSs in order.

20 Claims, 8 Drawing Sheets

(51) Int. Cl.
  *H04L 25/02* (2006.01)
  *H04L 25/03* (2006.01)
  *H04L 27/26* (2006.01)
  *H04B 7/0417* (2017.01)
(52) U.S. Cl.
  CPC ...... *H04L 25/0204* (2013.01); *H04L 25/0224* (2013.01); *H04L 25/03949* (2013.01); *H04L 27/2613* (2013.01); *H04B 7/0417* (2013.01)
(58) Field of Classification Search
  USPC ....... 370/203, 208, 310, 328, 339, 342–345, 370/465
  See application file for complete search history.

(56) References Cited

U.S. PATENT DOCUMENTS

| | | | | |
|---|---|---|---|---|
| 9,432,099 B2* | 8/2016 | Ko | ............................ | H04L 1/00 |
| 9,491,654 B2* | 11/2016 | Ko | ....................... | H04B 7/0626 |
| 9,532,254 B2* | 12/2016 | Ko | ....................... | H04B 7/0626 |
| 9,680,552 B2* | 6/2017 | Ko | ....................... | H04B 17/00 |
| 9,716,539 B2* | 7/2017 | Kim | ....................... | H04B 17/00 |
| 9,814,030 B2* | 11/2017 | Park | ...................... | H04B 7/068 |
| 10,027,395 B2* | 7/2018 | Park | ...................... | H04B 7/0626 |
| 2010/0195748 A1 | 8/2010 | Nam et al. | | |
| 2011/0223876 A1 | 9/2011 | Kang | | |
| 2011/0310838 A1 | 12/2011 | Zheng et al. | | |
| 2012/0163318 A1 | 6/2012 | Kishiyama et al. | | |
| 2012/0163335 A1 | 6/2012 | Chung et al. | | |
| 2013/0201926 A1* | 8/2013 | Nam | ..................... | H04L 1/1685 370/329 |
| 2013/0242949 A1 | 9/2013 | Hu et al. | | |
| 2013/0315197 A1* | 11/2013 | Park | ..................... | H04W 72/042 370/329 |
| 2015/0244509 A1* | 8/2015 | Lee | ....................... | H04L 5/0048 370/336 |
| 2016/0212643 A1* | 7/2016 | Park | ..................... | H04B 7/0626 |

\* cited by examiner

APPARATUS AND METHOD OF TRANSMITTING AND RECEIVING REFERENCE SIGNAL IN WIRELESS COMMUNICATION SYSTEM USING MULTIPLE-INPUT AND MULTIPLE-OUTPUT

CROSS-REFERENCE TO RELATED APPLICATION(S) AND CLAIM OF PRIORITY

The present application is related to and claims the benefit under 35 U.S.C. § 119(a) of a Korean patent application filed on Feb. 25, 2014 in the Korean Intellectual Property Office and assigned Serial No. 10-2014-0021719, the entire disclosure of which is hereby incorporated by reference.

TECHNICAL FIELD

The present application relates to wireless communication systems. More particularly, the application relates to an apparatus and method of transmitting and receiving a Reference Signal (RS) in a wireless communication system using Multiple-Input and Multiple-Output (MIMO) and to a system adapted to the method.

BACKGROUND

With the rapid spread of wireless communication devices, such as smart phones, tablet PCs, and the like, the amount of mobile communication data has also rapidly increased at an average annual rate of 50%~200%. In response to the rapid increase in the amount of mobile communication data, a variety of technologies have been developed to enhance data transmission speed. One of the most reliable methods for increasing data transmission speed is to use a frequency bandwidth as broad as possible. However, it is difficult to secure a broader frequency bandwidth from the currently used frequency bandwidth for mobile communication systems.

Another method for increasing data transmission speed or capacity of wireless communication systems is to increase the number of antennas between transmitters and receivers for communication. The method employing a number of antennas is a technology using an array of antennas, that is, Multi-user Multiple-Input and Multiple-Output (Multi-user MIMO). The technology makes it possible to transmit data at a high speed, thereby increasing the capacity of systems.

In order to implement a system using a number of antennas, the transmitters require information about channels to communicate with the receivers for receiving data. For example, if a network operates in Frequency Division Duplex (FDD), the receiver receives a Reference Signal (RS) to provide channel information to the transmitter, estimates channel information using the RS, and feeds it back to the transmitter through an uplink. More specifically, the transmitter transmits a preset Reference Signal (RS) to the receiver. The receiver receives the RS from the transmitter, estimates a channel based on the RS, quantizes a state of the estimated channel, and feeds the information about the quantized channel back to the transmitter.

For example, an LTE-Advanced network using a number of antennas, the receiver uses a Channel State Information Reference Signal (CSI-RS) to estimate channel information. In addition, LTE-Advanced network is designed in such a way that CSI-RSs have orthogonality by antennas to achieve precise channel estimation.

This network design increases the amount of resources to transmit CSI-RS with orthogonality for every antenna in proportion to the increased number of antennas in the transmitter.

Although the conventional system increases the number of antennas to step up the capacity, it causes to increase the amount of resources to estimate a channel because of the characteristics of CSI-RS, thereby decreasing the efficiency of resource use.

SUMMARY

To address the above-discussed deficiencies, it is a primary object to provide an apparatus and method that can efficiently transmit and receive a Reference Signal (RS) for channel estimation in a wireless communication system using Multiple-Input and Multiple-Output (MIMO); and a system adapted to the method.

The present disclosure further provides an apparatus and method for transmitting and receiving an RS that can increase the efficiency of resources in a wireless communication system using MIMO; and a system adapted to the method.

The present disclosure further provides an apparatus and method for transmitting and receiving an RS that can increase the efficiency of resources and perform precise channel estimation in a wireless communication system using MIMO; and a system adapted to the method.

In accordance with an exemplary embodiment of the present disclosure, the present disclosure provides a method for transmitting Reference Signal (RSs) in a wireless communication system using Multiple Input Multiple Output (MIMO), including: determining the number of RS transmission to two or more antennas, respectively, as the number of antennas included in respective ports, wherein each port includes one or more antennas; creating transmit patterns that cyclically differ from each other every the number of RS transmission to transmit the created transmit patterns the number of RS transmission times; and mapping the RSs to one or more antennas according to the created, respective patterns, and transmitting the RSs in order.

In accordance with another exemplary embodiment of the present disclosure, the present disclosure provides a method for estimating a channel by using received Reference Signals (RSs) in a receiver of a wireless communication system using Multiple Input Multiple Output (MIMO), including: receiving transmit pattern information about the RSs from a transmitter with two or more ports each of which includes one or more antennas, through the respective antennas; receiving the RSs of different patterns, the number of which is the number of transmissions determined according to the transmit pattern from the transmitter; and estimating, when patterns of a preset number of transmission have been received, channels by the respective antennas by using the received patterns and the transmit pattern information by the respective ports of the transmitter.

In accordance with another exemplary embodiment of the present disclosure, the present disclosure provides a transmitter for transmitting Reference Signals (RSs) in a wireless communication system using Multiple Input Multiple Output (MIMO), including: an antenna unit with two or more ports each of which includes one or more antennas; an RS creating unit for creating RSs of different patterns, the number of which is the number of ports; a virtual antenna mapping unit (YAM) for mapping and outputting the RSs, output from the RS creating unit, to one or more antennas, respectively; and a mapping signal creating unit for determining the number of RS transmission as the number of antennas included in respective ports; creating transmit patterns that cyclically differ from each other every the number of RS transmission to transmit the created transmit patterns the number of RS transmission times; and mapping the RSs to one or more antennas according to the created, respective patterns, and transmitting the RSs in order.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
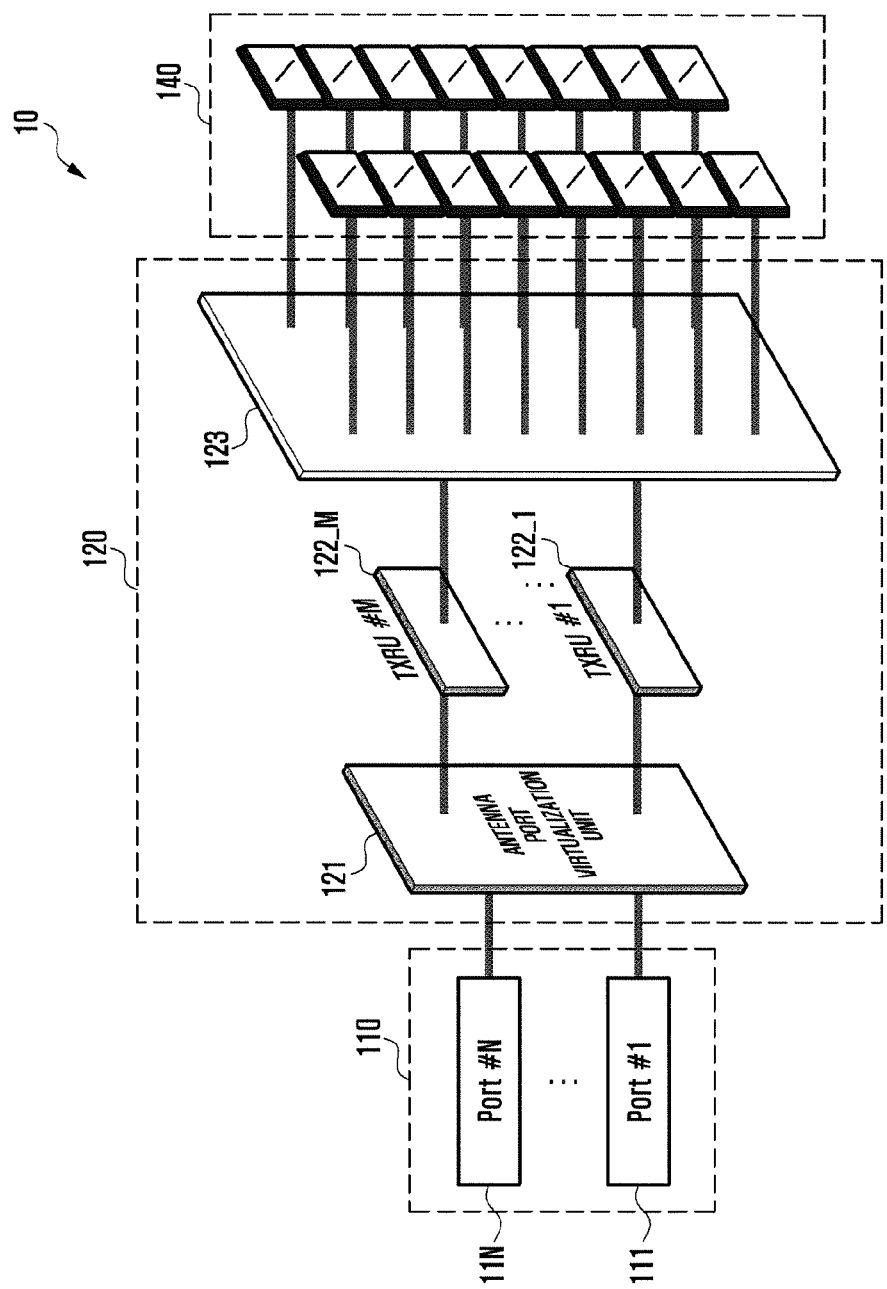
FIG. 1 is a schematic block diagram that describes a virtual antenna mapping unit for transmitting a Reference Signal (RS) through an antenna in a system using Multiple-Input and Multiple-Output (MIMO)

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communications device. Hereinafter, embodiments of the present disclosure are described in detail with reference to the accompanying drawings. The same reference numbers are used throughout the drawings to refer to the same or similar parts. It should be understood that the present disclosure is not limited to any form or arrangement of the components in the drawings since the drawings are just illustrated to assist those skilled in the art to more fully understand the disclosure. Detailed descriptions of well-known functions and structures incorporated herein may be omitted to avoid obscuring the subject matter of the disclosure. In the following description, the terms or words described in the description and the claims should not be limited by a general or lexical meaning, instead should be analyzed as a meaning and a concept through which the inventor defines and describes the disclosure to the best of his/her ability, to comply with the idea of the disclosure.

FIG. 1 is a schematic block diagram that describes a virtual antenna mapping unit for transmitting a Reference Signal (RS) through an antenna in a system using Multiple-Input and Multiple-Output (MIMO).

Referring to FIG. 1, the transmitter 10 includes a reference signal (RS) creating unit 110, a virtual antenna mapping unit (VAM) 120 and an antenna unit 140. The components are described in detail as follows.

The RS creating unit 110 creates reference signals (RSs) to be transmitted antennas. For example, as shown in FIG. 1, Port 1 RS creating unit 11_1 of the RS creating unit 110 creates an RS to be transmitted to Port 1 and outputs it. Port N RS creating unit 11_N of the RS creating unit 110 creates an RS to be transmitted to Port N and outputs it.

The virtual antenna mapping unit (VAM) 120 performs antenna port virtualization and virtualization of a Transceiver Unit (TXRU) as a unit of baseband process, namely, TXRU virtualization.

The antenna port virtualizing unit 121 of the VAM 120 virtualizes RSs so that the RSs correspond to antenna ports respectively and outputs the RSs to the ports. For example, N RSs virtualized according to the number of antenna ports (N is an integer) are mapped to M TXRUs (M is an integer). One RS for an antenna port can be mapped to one or more TXRUs. As an example, for a one-to-one mapping, Port 1 RS creating unit 11_1 of the RS creating unit 110 can be mapped to one TXRU. As another example, for a one-to-two mapping, Port 1 RS creating unit 11_1 of the RS creating unit 110 can be mapped to two TXRUs. As such, the antenna port virtualizing unit 121 maps RSs by antenna ports to one or more TXRUs.

The TXRU virtualizing unit 123 maps one TXRU to one or more antennas, such as, M TXRUs to P antennas, where M and P are integers, respectively. As an example, for a one-to-one mapping, the TXRU virtualizing unit 123 connects one TXRU to one antenna. As another example, for a one-to-two mapping, the TXRU virtualizing unit 123 connects one TXRU to two antennas. As such, the TXRU virtualizing unit 123 connects one TXRU to one or more antennas. Therefore, signals virtualized as a unit of TRXU in the VAM 120 are input to the antenna unit 140, respectively, and transmitted through corresponding antennas.

Although the embodiment referring to FIG. 1 is described based on the components for processing baseband signals, it should be understood that the embodiment includes a component for up-converting the baseband to RF band, which is not shown. The component for up-converting the baseband to RF band may be connected to the output end of the TXRU virtualizing unit 123. Although the embodiment referring to FIG. 1 is described in such a way that the number of antennas is 16, it can be modified in such a way that the number of antennas is greater or less than 16.

The VAM 120 performs the entire process from a process of creating RSs by antenna ports to a process of transmitting RSs to real antennas. RS antenna ports can create various types of signals according to the use. In the current LTE standards, RS antenna ports create CRS, CSI-RS, DM-RS, etc.

In the following description, the term 'antenna' is also called 'antenna element.'

Figure 2:
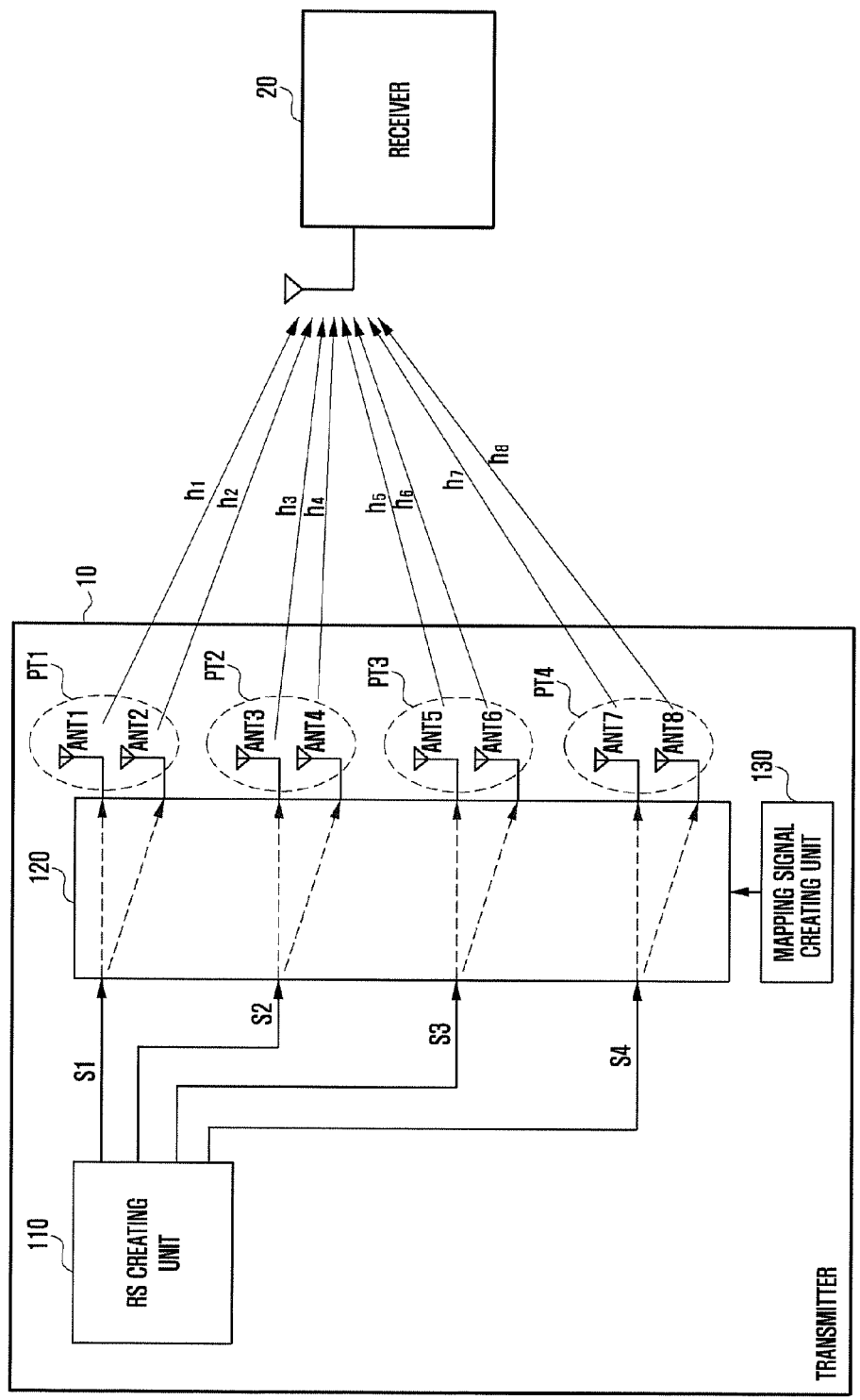
FIG. 2 is a schematic block diagram that describes a method for transmitting an RS in a system using MIMO according to an embodiment of the present disclosure.

FIG. 2 is a schematic block diagram that describes a method of transmitting an RS in a system using MIMO according to an embodiment of the present disclosure.

It should be understood that the components of the embodiment shown in FIG. 2 are indicated by the same reference numbers shown in FIG. 1 so that they refer to the same components. Since the components in the RS creating unit 110 and the virtual antenna mapping unit (VAM) 120 was explained above referring to FIG. 1, they are not illustrated in FIG. 2.

Referring to FIG. 2, the transmitter 10 and the receiver 20 are a device for performing transmission and a device for performing reception with respect to the RS, respectively. As an example, when the present disclosure is applied to cellular systems, the transmitter 10 for transmitting RSs can be a cell or a base station, and the receiver 20 can be user equipment (UE). As another example, when the present disclosure is applied to wireless LAN systems, the transmitter 10 can be an Access Point (AP), and the receiver 20 can be a node or terminal for communicating with the AP. As such, it should be understood that the transmitter 10 and the receiver 20 may be called different names according to types of systems that the disclosure is applied to. In the following description, for the sake of convenient description, the disclosure is applied to an LTE-Advanced system. Although the following embodiment is described based on an LTE-Advanced system, it should be understood that the disclosure is not limited to LTE system or LTE-advanced system. For example, it will be appreciated to those skilled in the art that the disclosure can be applied to all types of systems that transmit and receive RSs using a number of antennas, such as, a wireless LAN system, and the like.

The transmitter 10 includes RS creating unit 110, a virtual antenna mapping unit (VAM) 120, a mapping signal creating unit 130 and a number of antennas, ANT1, ANT2, ANT3, ANT4, ANT5, ANT6, ANT7 and ANT8. The antennas, ANT1, ANT2, ANT3, ANT4, ANT5, ANT6, ANT7 and ANT8, refer to those in the antenna unit 140 shown in FIG. 1. Although the embodiment shown in FIG. 2 is described in such a way that the number of antennas is eight, it should be understood that the number of antennas is M, where M is an integer greater than or equal to two. However, it is preferable that the number of antennas is eight to maximize the increase effect of the capacity of system when RSs are transmitted through the antennas. Therefore, the embodiment will be described based on 8 antennas. In addition, the modification, implemented to include more than 8 antennas, will be described later.

The RS creating unit 110 creates RSs the number of which is equal to or less than the number of antennas, which are transmitted to corresponding antennas. The RSs created in the RS creating unit 110 can be signals predefined between the RS creating unit 110 and the receiver 20. The present disclosure is a system adapted to the method of creating RSs predefined between the transmitter 10 and the receiver 20. That is, the present disclosure is a system where the transmitter 10 and the receiver 20 share part or all of the antenna port virtualization and the TXRU virtualization rule shown in FIG. 1. The number of RSs created in the RS creating unit 110 is determined according to the number of antenna ports that will be described as follows. As shown in FIG. 2, when: first antenna ANT1 and second antenna ANT2 is grouped to correspond to a first port PT1; third antenna ANT3 and fourth antenna ANT4 to a second port PT2; fifth antenna ANT5 and sixth antenna ANT6 to a third port PT3; and seventh antenna ANT7 and eighth antenna ANT8 to a fourth PT4, the RS creating unit 110 creates four RSs, S1, S2, S3, and S4, to be transmitted to corresponding ports, respectively.

The virtual antenna mapping unit (VAM) 120 maps the RSs, S1, S2, S3, and S4, transmitted from the RS creating unit 110, based on a mapping rule from the mapping signal creating unit 130, so that the RSs, S1, S2, S3, and S4 can be transmitted to corresponding antennas. Although the embodiment can be implemented in such a way as to include the mapping signal creating unit 130 as a separate module as shown in FIG. 2, it can be modified in such a way that the mapping signal creating unit 130 is included in the VAM 120 or in other components, not shown in FIG. 2, such as, a processor, a memory, and so forth. It is preferable to configure the VAM 120 so that the pattern is determined based on the number of antennas, the number of ports, and the like, and stored in a memory (not shown in FIGS. 1 and 2), or so that it is operated according to a preset pattern in the process of implementation.

The VAM 120 maps different RSs, transmitted from the RS creating unit 110, based on a rule from the mapping signal creating unit 130, so that they can be transmitted to corresponding antennas, respectively. As shown in FIG. 2, the VAM 120 maps a particular RS so that it can be distributed to different antennas included in one port and transmitted through the antennas. For example, the VAM 120 maps a first RS, S1, transmitted from the RS creating unit 110, so that it can be distributed to a first port PT1 and transmitted through a first antenna ANT1 and a second antenna ANT2. The VAM 120 maps a second RS, S2, transmitted from the RS creating unit 110, so that it can be distributed to a second port PT1 and transmitted through a third antenna ANT3 and a fourth antenna ANT4. The VAM 120 maps a third RS, S3, transmitted from the RS creating unit 110, so that it can be distributed to a third port PT3 and transmitted through a fifth antenna ANT5 and a sixth antenna ANTE. The VAM 120 maps a fourth RS, S4, transmitted from the RS creating unit 110, so that it can be distributed to a fourth port PT4 and transmitted through a seventh antenna ANT1 and an eight antenna ANTE.

The following embodiment describes a case where the embodiment is applied to LTE systems. Common Reference Signal (CRS) is a type of RS introduced to the LTE standard. An LTE system transmits a CRS through a maximum of four transmit antenna ports in order to support LTE user equipment (UE). In addition, when a real base station uses a number of antennas greater than four, there exists an issue as to whether a method of transmitting a CRS through four transmit antenna ports can be implemented in the base station. Therefore, when a virtual antenna mapping method, which will be described later, is applied to the transmitter 10, although the transmitter 10 has more than 4 real antennas, the existing LTE receiver 20 operates in the same way as it receives CRSs that the transmitter 10 transmitted through a maximum of four antennas.

The receiver 20 receives RSs transmitted from the transmitter 10 with a number of antennas, and measures (or estimates) wireless channels from each of the antennas of the transmitter 10 to the antenna of the receiver 20. After measuring (estimating) wireless channels, the receiver 20 feeds back information about the wireless channels to the transmitter 10 through a preset channel.

The detailed operation of the transmitter 10 shown in FIG. 2 is described as follows.

When the number of antennas included in the transmitter 10 is M (an integer), M is 8 in the embodiment of FIG. 2. The CSI-RS between the transmitter 10 and the receiver 20 is transmitted to ports, respectively. For example, a first RS S1 is transmitted to a first port PT1; a second RS S2 to a second port PT2; a third RS S3 to a third port PT3; and a fourth RS S4 to a fourth port PT4. Therefore, the receiver 20 can measure channel states by ports.

Let's assume that: a channel between a first antenna ANT1 and the receiver 20 is denoted by h1; a channel between a second antenna ANT2 and the receiver 20 is denoted by h2; a channel between a third antenna ANT3 and the receiver 20 is denoted by h3; a channel between a fourth antenna ANT4 and the receiver 20 is denoted by h4; a channel between a fifth antenna ANT5 and the receiver 20 is denoted by h5; a channel between a sixth antenna ANT6 and the receiver 20 is denoted by h6; a channel between a seventh antenna ANT1 and the receiver 20 is denoted by h7; and a channel between an eighth antenna ANT8 and the receiver 20 is denoted by h8. Let's assume that: a channel value between a first port PT1, transmitting a real same RS, and the receiver 20, such as, a channel value, estimated (measured) by using an RS that the receiver 20 receives through a first port PT1, is denoted by g1; a channel value between a second port PT2 and the receiver 20 is denoted by g2; a channel value between a third port PT3 and the receiver 20 is denoted by g3; and a channel value between a fourth port PT4 and the receiver 20 is denoted by g4.

In that case, the transmission of CSI-RS shown in FIG. 2 can be expressed as the following Equation 1.

$$Vh = \begin{bmatrix} 1 & 1 & 0 & 0 & 0 & 0 & 0 & 0 \\ 0 & 0 & 1 & 1 & 0 & 0 & 0 & 0 \\ 0 & 0 & 0 & 0 & 1 & 1 & 0 & 0 \\ 0 & 0 & 0 & 0 & 0 & 0 & 1 & 1 \end{bmatrix} \begin{bmatrix} h_1 \\ h_2 \\ h_3 \\ h_4 \\ h_5 \\ h_6 \\ h_7 \\ h_8 \end{bmatrix} = \begin{bmatrix} g_1 \\ g_2 \\ g_3 \\ g_4 \end{bmatrix} = g \quad \text{Equation 1}$$

where V denotes a matrix representing a mapping rule created in the mapping signal creating unit 130, h denotes a channel matrix of a receiver 20 by antennas, and g denotes a matrix of channel values measured (estimated) by transmit ports in the receiver 20.

When an RS is transmitted by a unit of ports grouped by a preset number, the receiver 20 ascertains that, although the transmitter 10 has more than four antennas, it has a maximum of four antenna ports, and performs channel estimation regardless of types of signals processed in the transmitter 10.

As described above, the method according to the disclosure is performed in such a way that the transmitter transmits RSs by using antennas as many as possible and the receiver measures (or estimates) wireless channels by antennas, respectively.

Figure 3:
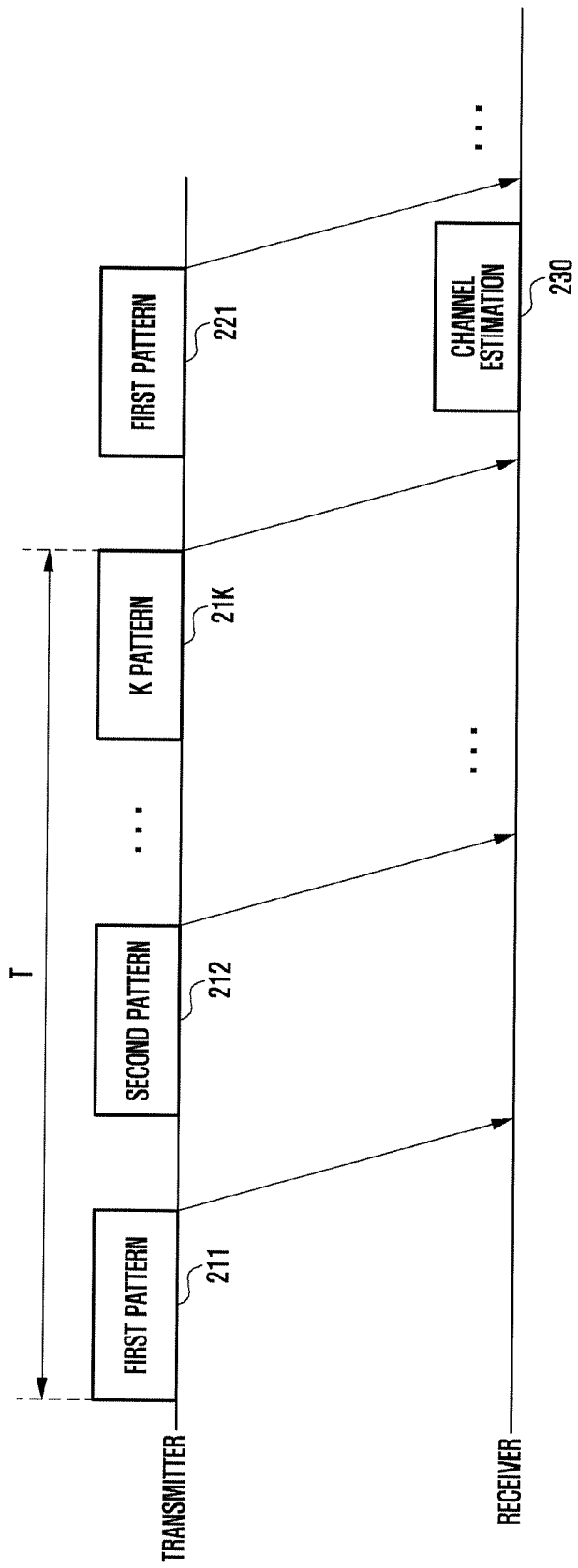
FIG. 3 is a timing diagram that describes a method for transmitting signals through antenna ports the number of which is less than the number of transmit antennas according to an embodiment of the present disclosure.

FIG. 3 is a timing diagram that describes a method of transmitting signals through antenna ports the number of which is less than the number of transmit antennas, according to an embodiment of the present disclosure.

Referring to FIG. 3, the transmitter 10 transmits Common Reference Signal (CRS) in different patterns, such as a first pattern 221, a second pattern 212, . . . , a K-th pattern 21K, etc. The patterns, 221, 212, . . . , 21K, are in a period T of transmitting CRS. When the receiver 20 has received all the patterns within one period, it performs pattern estimation 230 by using the received patterns. Although it is not shown in FIG. 3, when the receiver 20 completed channel estimation 230, it can feedback the estimated channel information to the transmitter 10. In addition, when the transmitter 10 has completed transmission of patterns within one period T, it starts to perform transmission of patterns from a first pattern 221, and so on.

The patterns, 221, 212, . . . , 21K, can be mapping patterns that the mapping signal creating unit 130 of the transmitter 10 creates through Equation 1. When mapping pattern is determined by the method described above referring to FIG. 2, it is impossible to perform channel estimation for all the antennas. In the following description, a mapping method that can perform channel estimation for all the channels, according to the present disclosure, is described.

When CRS is transmitted to more than four transmit antennas through four ports, matrix V varies in structure, in time, in the mapping signal creating unit 130. The pattern of varying in structure of matrix V is cyclic.

When the embodiment of FIG. 3 is applied to an LTE-Advanced system, the transmitter 10 maps M antennas to four ports, maps CRS to antennas of each port by using matrix V to form a particular pattern, and transmits the signal. The embodiment can be implemented in such a way that one antenna corresponds to one port or two or more antennas correspond to one port. The following description describes an embodiment implemented so that two or more antennas configure one port.

As patterns transmitted according to ports are varied based on a unit of a preset period of time, channels between each of the antennas and the receiver 20 can be estimated. The number of patterns, K (an integer), varying in time, by ports, may vary according to the number of antennas.

If CRS is transmitted, assuming that the number of antennas M is 8 and the number of patterns K is 2, the patterns vary as follows. For example, the transmission pattern of the first CRS may be expressed by Equation 2 as follows.

$$V^{(1)}h = \begin{bmatrix} 1 & 1 & 0 & 0 & 0 & 0 & 0 & 0 \\ 0 & 0 & 1 & 1 & 0 & 0 & 0 & 0 \\ 0 & 0 & 0 & 0 & 1 & 1 & 0 & 0 \\ 0 & 0 & 0 & 0 & 0 & 0 & 1 & 1 \end{bmatrix} \begin{bmatrix} h_1 \\ h_2 \\ h_3 \\ h_4 \\ h_5 \\ h_6 \\ h_7 \\ h_8 \end{bmatrix} = \begin{bmatrix} g_1^{(1)} \\ g_2^{(1)} \\ g_3^{(1)} \\ g_4^{(1)} \end{bmatrix} = g^{(1)} \quad \text{Equation 2}$$

In Equation 2, when the first transmission pattern expressed by digits '0' and '1' is defined as matrix $V^{(1)}$ and a channel between each of the antennas and the receiver 20 is defined as matrix h, the receiver 20 receives the first CRS and can estimate a matrix $g^{(1)}$. Similarly, the transmission pattern of the second CRS can be expressed by Equation 3 as follows.

$$V^{(2)}h = \begin{bmatrix} 1 & 0 & 1 & 0 & 0 & 0 & 0 & 0 \\ 0 & 1 & 1 & 0 & 0 & 0 & 0 & 0 \\ 0 & 0 & 0 & 0 & 1 & 0 & 1 & 0 \\ 0 & 0 & 0 & 0 & 0 & 1 & 1 & 0 \end{bmatrix} \begin{bmatrix} h_1 \\ h_2 \\ h_3 \\ h_4 \\ h_5 \\ h_6 \\ h_7 \\ h_8 \end{bmatrix} = \begin{bmatrix} g_1^{(2)} \\ g_2^{(2)} \\ g_3^{(2)} \\ g_4^{(2)} \end{bmatrix} = g^{(2)} \qquad \text{Equation 3}$$

In Equation 3, when the second transmission pattern expressed by digits '0' and '1' is defined as matrix $V^{(2)}$ and a channel between each of the antennas and the receiver 20 is defined as matrix h, the receiver 20 receives the second CRS and can estimate a matrix $g^{(2)}$.

Meanwhile, Equations 2 and 3, representing CRSs transmitted by the first and second transmission patterns, respectively, can be combined to form a single equation and this is written in the form of Equation 4 as follows.

$$Wh = \begin{bmatrix} 1 & 1 & 0 & 0 & 0 & 0 & 0 & 0 \\ 0 & 0 & 1 & 1 & 0 & 0 & 0 & 0 \\ 0 & 0 & 0 & 0 & 1 & 1 & 0 & 0 \\ 0 & 0 & 0 & 0 & 0 & 0 & 1 & 1 \\ 1 & 0 & 1 & 0 & 0 & 0 & 0 & 0 \\ 0 & 1 & 1 & 0 & 0 & 0 & 0 & 0 \\ 0 & 0 & 0 & 0 & 1 & 0 & 1 & 0 \\ 0 & 0 & 0 & 0 & 0 & 1 & 1 & 0 \end{bmatrix} \begin{bmatrix} h_1 \\ h_2 \\ h_3 \\ h_4 \\ h_5 \\ h_6 \\ h_7 \\ h_8 \end{bmatrix} = \begin{bmatrix} g_1^{(2)} \\ g_2^{(2)} \\ g_3^{(2)} \\ g_4^{(2)} \\ g_1^{(2)} \\ g_2^{(2)} \\ g_3^{(2)} \\ g_4^{(2)} \end{bmatrix} = g_r \qquad \text{Equation 4}$$

where the matrix W is a matrix formed by the combination of the first and second transmission pattern matrices $V^{(1)}$ and $V^{(2)}$. Matrix $g_r$ is a matrix created by the combination of matrices $g^{(1)}$ and $g^{(2)}$ that the receiver 20 estimated based on the form where it receives and arranges the first and second CRSs through each of the ports, respectively.

The receiver 20 has known the first and second transmission pattern matrices $V^{(1)}$ and $V^{(2)}$ as expressed by Equations 2 and 3, and also the matrices $g^{(1)}$ and $g^{(2)}$ estimated based on the form where it receives and arranges the first and second CRSs through each of the ports, respectively. Therefore, matrix h of channels from the respective antennas to the receiver 20 can be obtained by using Equations 2 and 3 or Equation 4. To do this, it needs to assume that channels don't vary at time points that the first pattern 211 and the second pattern 212 are transmitted.

The foregoing embodiment is described in such a way that a system with eight antennas transmits signals through four ports, twice. Therefore, it will be appreciated to those skilled in the art that pattern of matrix V, the number of antennas and structure of a Reference Signal (RS) may vary according to types of real system.

The following description explains CRS transmission patters, such as, patterns of matrices $V^{(1)}$ and $V^{(2)}$ created in the mapping signal creating unit 130 shown in FIGS. 1 and 2.

To determine a pattern of transmitting a CRS, it is preferable that matrix V needs to be designed to satisfy a particular condition to estimate channels of all the antennas included in one antenna port.

In order to estimate channel matrix h in the receiver after using a pattern of K CRS transmissions as shown in FIG. 3, Equation 4 is created and expressed in the form of $Wh=g_r$. When transmission pattern matrix W created by the combination of a first pattern to K-th pattern varying in time is defined as the 'entire transmission pattern,' each of the first pattern to K-th pattern can be defined as a 'partial transmission pattern.' The entire transmission pattern or the partial transmission patters may be cyclically transmitted.

Matrix W of the entire transmission pattern of partial transmission patterns transmitting CRS can be designed to satisfy a condition expressed by the following Equation 5.

$$\text{rank}(W) = M \qquad \text{Equation 5}$$

where M (an integer) denotes the number of antennas in the transmitter 10 and 'rank' is a term used in linear algebra, rank (W) meaning that the size of largest collection of columns or rows of matrix W. Since Equation 5 means K times transmissions, matrix W must be designed to satisfy a mathematical condition to estimate M channels, by combining K partial transmission patterns.

In the following description, a method of satisfying a condition of Equation 5 by matrices of partial transmission patterns is explained in detail referring to the accompanying drawings.

Figure 4:
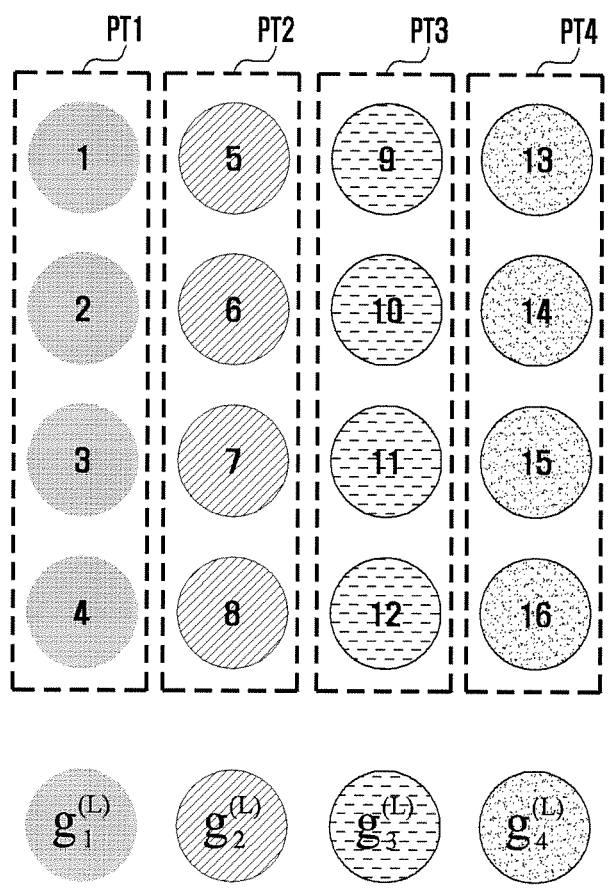
FIG. 4 is a view that describes a method of grouping 16 antennas by four ports according to an embodiment of the present disclosure.

FIG. 4 is a view that describes a method of grouping 16 antennas by four ports according to an embodiment of the present disclosure.

Referring to 4, circles labeled with numbers 1 to 16 represents 16 antennas. The 16 antennas can be grouped to form patterns shaped as rectangles, aligned in line. Since the illustrative shape of patterns may vary according to the alignment of antennas, it should be understood that the present disclosure is not limited to the shape.

The receiver 20 employing a number of antennas, according to the present disclosure, regards a number of antennas included in the transmitter 10 as a certain number of ports, such as, four, which performs signal transmission. Therefore, when the transmitter 10 is equipped with 16 antennas, M=16, they are grouped by four, four antennas forming one port, as the transmitter 10 transmits CRS through four ports.

As shown in FIG. 4, antennas 1 to 4 are grouped as a first port PT1; antennas 5 to 8 are grouped as a first port PT2; antennas 9 to 12 are grouped as a first port PT3; and antennas 13 to 16 are grouped as a first port PT4. The embodiment of FIG. 4 shows patterns to which CRS are mapped according to ports. That is, the ports PT1 to PT4 receive different types of CRS respectively.

As shown in FIG. 4, CRSs are transmitted through four ports each of which includes four antennas. Therefore, in order to estimate channels by antennas, CRSs need to be transmitted through four partial transmission patterns. That is, when one port includes four antennas, K=4.

Let's assume that a CRS mapping pattern shown in FIG. 4 is an L-th CRS mapping pattern. In that case, a signal of an i-th port in the L-th CRS mapping pattern can be expressed by $g_i^{(L)}$. If a set of ports mapping to $g_i^{(L)}$ is expressed by $P_i^{(L)}$, $g_i^{(L)}$ is written in the form of Equation 6 as follows.

$$g_i^{(L)} = \sum_{k \in P_i^{(L)}} h_k \qquad \text{Equation 6}$$

Equation 6 expresses a rule of transmitting CRS through i-th port in the L-th CRS mapping pattern. The transmission rule of each port expressed by Equation 6 can be designed by a method expressed by the following Equation 7.

$$n(P_i^{(L)} \cap P_i^{(L+1)}) = n(P_j^{(L)} \cap P_j^{(L+1)}) = \beta_L, \forall i \neq j \quad \text{Equation 7}$$

Equation 7 means that the number of antennas mapped to a i-th port and the number of antennas mapped to a j-th port in the L-th port mapping pattern expressed by Equation 6 are equal to each other, B (an integer).

Equation 7 means that the i-th port and the j-th port in the L-th port mapping pattern expressed by Equation 6 are identical in the number of antennas mapped to them, e.g., B (an integer). When the number of antennas is M and the number of ports transmitting CRSs is four as described in the current LTE standard, B is M/4.

The transmission rule of a port transmitting CRS, expressed by Equation 6, can be designed by the following Equation 8.

$$n(P_i^{(L)} \cap P_i^{(L+1)}) = n(P_j^{(L)} \cap P_j^{(L+1)}) = \beta_L, \forall i \neq j \quad \text{Equation 8}$$

Equation 8 means that, since the L-th and L+1-th CRS mapping patterns for the i-th CRS transmitting port are duplicated with respect to a particular port, the number of antennas transmitting CRS needs to be identical to the number of ports for the j-th CRS antennas. This condition is to transmit CRS as uniform as possible, thereby including various types of channel effects.

Figure 5:
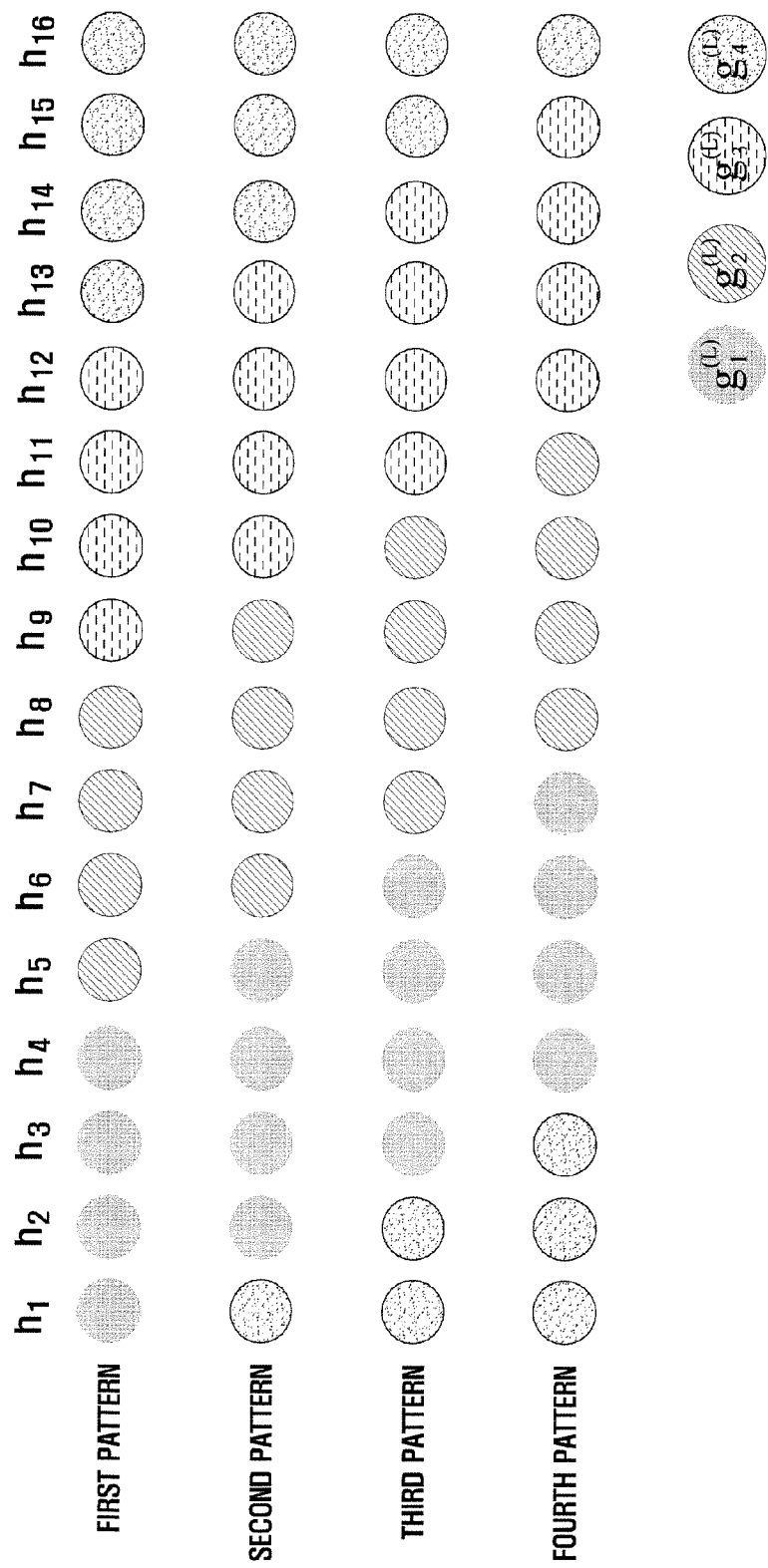
FIG. 5 is a view of patterns that are transmitted in order, where M=16 and $\beta_L=3$ according to an embodiment of the present disclosure.

FIG. 5 is a view of patterns that are transmitted in order, where M=16 and $\beta_L$=3 according to an embodiment of the present disclosure.

Referring to FIG. 5, channels, $h_1$, $h_2$, $h_{16}$, between the receiver 20 and the antennas of the transmitter 10 can be antennas 1, 2, . . . , 16 with respect to the transmitter 10.

First, second, third and fourth patterns shown in FIG. 5 are identical to the first pattern 211, . . . , K-th pattern 21K transmitted from the transmitter 20 shown in FIG. 3. In that case, K is 4. First, second, third and fourth patterns shown in FIG. 5 are transmitted at a certain time interval. The transmission time of the four patterns is one period.

When four antennas form one port, patterns output from each of the ports are various and this is described as follows referring to FIG. 5. When a CRS of a first pattern has been transmitted through each of the ports and a CRS of a second pattern, the difference between the first and second patterns at a particular port is that only one antenna transmits a signal different from signals of the other antennas through a corresponding port. Conversely, when four antennas transmitted an L-th CRS through a particular port transmit the L+1-th CRS, the three antennas transmit the L-th CRS that was transmitted at the previous time point. Therefore, the embodiment uses Equation 8 described above.

According to the rule described above, all the antenna ports follow the design condition expressed by Equation 8 and include a rule $\beta_L$=3.

The transmission rule of ports transmitting CRS, expressed by Equation 6, can be designed by using a method written in the form of in Equation 9 as follows.

$$n(P_i^{(L)} \cap P_i^{(L+1)}) \geq \frac{M}{4} - \alpha, 0 \leq \alpha \leq \frac{M}{4} \quad \text{Equation 9}$$

In Equation 9, the left side of the inequality means the number of antennas that transmits the same signal when CRS is transmitted through the i-th port in mapping patterns to transmit the L-th CRS and the L+1-th CRS. That is, Equation 9 means that the number of antennas, transmitting the same signal in mapping patterns to transmit the L-th CRS and the L+1-th CRS through the i-th port, is greater than or equal to M/4=α.

When α is obtained, the number of antennas that transmits the same CRS in mapping patterns to transmit the L-th CRS and the L+1-th CRS is determined. In addition, when a representative value of $\beta_L$ in Equation 8 is β, α and β in Equation 9 have a relationship expressed by the following Equation 10.

$$\alpha + \beta = \frac{M}{4}, 0 \leq \alpha, \beta \leq \frac{M}{4} \quad \text{Equation 10}$$

In the foregoing description, the method and apparatus of transmitting RS according to the present disclosure was described in a wireless communication system using MIMO. It will be appreciated to those skilled in the art that the present disclosure can also applied to systems of estimating channels by antennas using RSs in a wireless communication using MIMO, such as LTE system, cellular communication system, and the like.

When the present disclosure is applied to LTE-Advanced systems, it needs to consider existing receivers, such as a Legacy User Equipment (Legacy UE).

In the following description, a method is described how to consider existing receivers when the present disclosure is applied to an LTE-Advanced system. In an LTE-Advanced system, the transmitter can be a base station or a cell, hereafter commonly called a base station, and the receiver can be Legacy UE.

The CRS transmitting method according to the present disclosure transmits different CRSs, according to antennas, time-dependently; however, conventional UE cannot process different CRSs. Therefore, if a base station intends to employ the CRS transmitting method according to the present disclosure, it needs to be designed so as not to affect the performance of Legacy UE. More specifically, for Legacy UE, transmitted values varies according to antennas each time that mapping information to transmit CRS varies.

For Legacy UE, channel information estimated according to antenna ports that transmitted CRS is used not only as feedback information but also to decode received data. Therefore, when CRSs are varied time-dependently and transmitted through the antennas, the transmitter cannot use feedback information transmitted from Legacy UE and the receiver cannot correctly decode data.

To prevent the problems, a first method according to the present disclosure time-dependently varies CRS patterns, maps and transmits them, thereby controlling schedules for Legacy UE. For example, the method can be a process for additionally setting a period of time for only Legacy UE or a process for setting, for only Legacy UE, one of the CRS patterns varied at a particular time point.

When Legacy UE is configured to process a type of mapping pattern at a particular time point, the Legacy UE can correctly estimate channels by ports and feed them back. Since the first method can use the correctly estimated channel information when receiving and processing data, it can allocate resources and transmit data without affecting the performance between Legacy UE and UE according to the present disclosure.

When Legacy UE is set to a transmission mode in a base station employing the present disclosure, a second method according to the present disclosure can be a method of liming the Legacy UE to a mode where feedback is not use. In LTE standards, nine transmission modes in total are designated. Of the nine transmission modes, transmission mode subject to system performance as mapping pattern information about CRS transmitting ports vary are modes where data fed back from Legacy UE is transmitted.

Of the LTE standards, in transmit diversity mode TM2 and open-loop MIMO mode TM3, transmission can be performed without the feedback of Legacy UE. Therefore, a base station is set so that a transmit mode of Legacy UE is limited to a mode without performing feedback, thereby avoiding the influence to the performance of Legacy UE.

Figure 6:
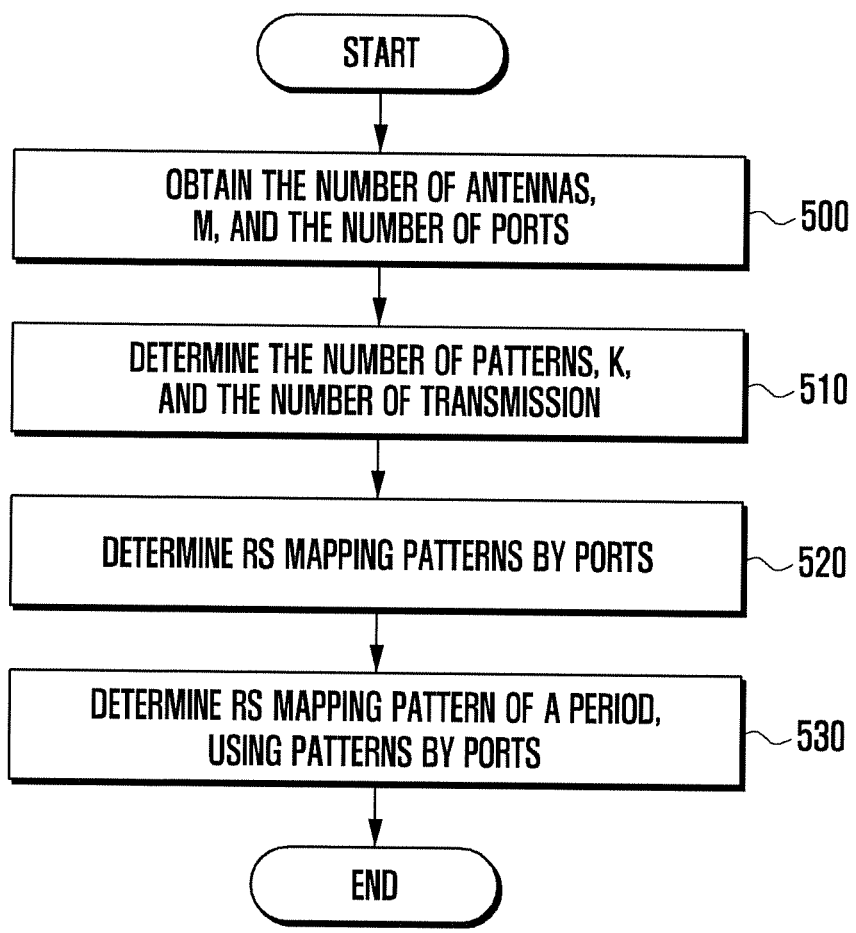
FIG. 6 is a flow chart that describes a method of creating an RS to be transmitted, varying in time, in a wireless communication system with a number of antennas according to an embodiment of the present disclosure.

FIG. 6 is a flow chart that describes a method of creating an RS to be transmitted, varying in time, in a wireless communication system with a number of antennas, according to an embodiment of the present disclosure.

According to the flow chart of FIG. 6, the patterns are calculated and created when the transmitter 10 is designed. The flow chart can be performed in the mapping signal creating unit 130 shown in FIGS. 1 and 2, each time that corresponding operations occur. In the following description, it is assumed that patterns are created from the point of view of system designers when the transmitter 10 is designed.

When the transmitter 10 is designed, the primary elements to be first considered are the number of entire antenna, M, and the number of ports, installed to the transmitter 10. The number of entire antenna, M, and the number of ports, installed to the transmitter 10, are obtained (500). For example, when the transmitter 10 is designed, the number of antennas to be installed the transmitter 10 is one of the elements to be first considered and can be determined based on a diversity gain and a system capacity. The number of ports may be set to four, as described in the LTE system standards, and so forth.

When the number of antennas, M, and the number of ports, for the transmitter, are determined, the system designer determines the number of patterns, K, and the number of transmission of CRS (510). The number of patterns, K, and the number of transmission of CRS can be the same value, and set to the minimum value, namely, the number of antennas M divided by the number of ports. As an example, if the number of antennas is eight and the number of ports is four, the total number of patterns and the minimum number of transmission is two, respectively. As another example, if the number of antennas is 16 and the number of ports is four, the total number of patterns and the minimum number of transmission is four, respectively When determining the number of patterns and the minimum number of transmission of CRS in operation 510, the system designer determines RS mapping patterns by ports (520). RS mapping patterns are determined as partial transmission patterns to be transmitted by respective ports are obtained, according to Equations 5 to 7. Since the meaning and creation of Equations 5 to 7 was described above, the detailed description will not be explained.

When obtaining partial transmission patterns according to Equations 5 to 7 in operation 520, the system designer determines an RS mapping pattern of a period, satisfying a condition of Equation 8 (530). For example, if the number of antennas is 16 and the number of ports is four, the RS mapping pattern of a period can be patterns shown in FIG. 5.

Figure 7:
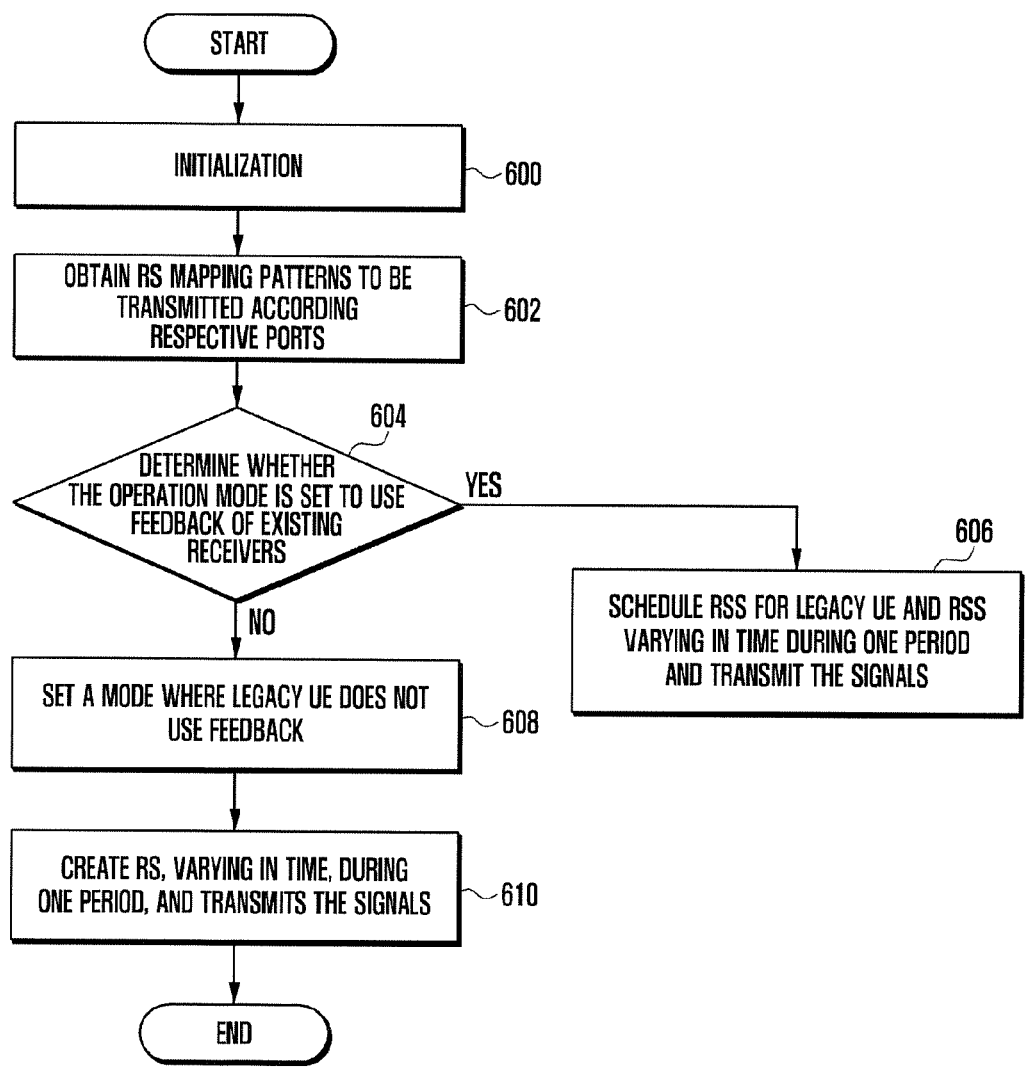
FIG. 7 is a flow chart that describes an initial operation in a base station of transmitting RSs according to an embodiment of the present disclosure.

FIG. 7 is a flow chart that describes an initial operation in a base station of transmitting RSs according to an embodiment of the present disclosure. The embodiment of FIG. 7 is described, assuming that information about patterns obtained through a method of FIG. 6 is stored in the mapping signal creating unit 130. The embodiment of FIG. 7 includes operations performed in a processor of a base station (not shown) or in the RS creating unit 110. In the following description, the embodiment of FIG. 7 will be described based on operations performed in the RS creating unit 110.

The RS creating unit 110 performs initialization (600). The initialization is an initial operation of the RS creating unit 110 by the transmitter or a request of a system operator or a user for an initial operation of the RS creating unit 110. Since the initialization corresponds to that of a base station or the transmitter, its detailed description will not be explained.

The RS creating unit 110 obtains RS mapping patterns to be transmitted according to respective ports from the built-in memory (not shown in FIGS. 1 and 2) or a particular module, e.g., a processor (602). The mapping patterns can be values set through the operations shown in FIG. 6.

After obtaining RS mapping patterns by respective ports in operation 602, the RS creating unit 110 determines whether it is set to use feedback of existing receivers (604). The determination as to whether to set to use feedback of existing receivers can be set by the manufacturer of transmitters or a system operator or user. Therefore, preset information is checked in operation 604.

When the RS creating unit 110 ascertains that it is set to use feedback of existing receivers in operation 604, the transmitter, corresponding to a base station of a cellular system or an LTE-system, transmits previously used RSs to a receiver that cannot receive RSs varying in time (606).

In operation 606, the RS creating unit 110 schedules RSs for Legacy UE and RSs varying in time during one period according to the present disclosure and transmits the signals. For example, the RS creating unit 110 has a transmission period for Legacy UE and a period for RSs varying in time according to the present disclosure. These periods can be configured in such a way that: RS is transmitted alternatively according to scheduling methods; or an RS for Legacy UE is transmitted and then RSs are transmitted in a form varying in time, such as, in the form of shown in FIG. 3, twice, trice, and so forth. It may also be possible to perform the opposite case.

In contrast, when the RS creating unit 110 ascertains that it is set not to use feedback of existing receivers in operation 604, it sets a mode where Legacy UE does not use feedback and transmits the mode setting signal to the Legacy UE (608). For example, since transmit diversity mode TM2 and open-loop MIMO mode TM3 in the LTE standards perform transmission without feedback of Legacy UE, the modes TM2 and TM3 are set for Legacy UE. After setting to a mode where Legacy UE does not user feedback in operation in 608, the RS creating unit 110 creates RS, varying in time, during one period, and transmits the signals (610). An example of operation 610 is a transmission shown in FIG. 3.

Figure 8:
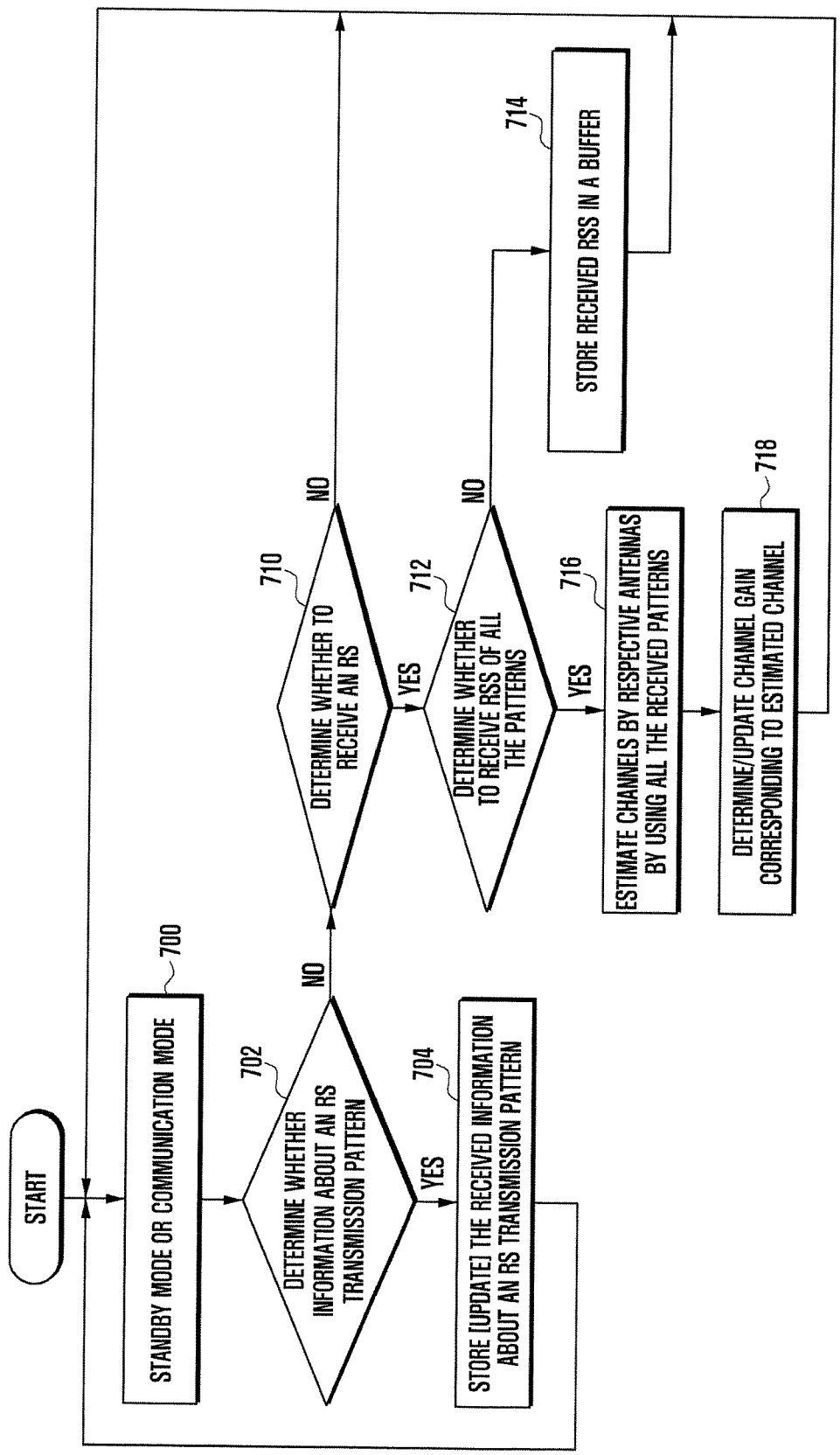
FIG. 8 is a flow chart that describes a method of estimating a channel in a receiver when receiving RSs according to an embodiment of the present disclosure.

FIG. 8 is a flow chart that describes a method of estimating a channel in a receiver when receiving RSs, according to an embodiment of the present disclosure.

The receiver 20 can be implemented in such a way as to receive and process RSs transmitted from the transmitter 10 as shown in FIGS. 1 to 7. The receiver 20 includes components for receiving and processing RSs transmitted from the transmitter 10 and can further include other components for corresponding functions.

Referring to FIG. 8, the receiver 20 operates in standby mode or communication mode (700). Standby mode refers to a state where most parts are turned off, waiting for particular events, such as, a user's input for requesting a particular operation, an event detecting whether an incoming call or outgoing call is made, and so forth. Communication mode is a state where the receiver 20 transmits and receives data to or from transmitter 10 through a channel. All the states described are commonly called standby mode or communication mode of operation 700. In particular, standby mode or communication mode of operation 700 refers to a state where RSs can be received from the transmitter 10.

While the receiver 20 operates in standby mode or communication mode in operation 700, the receiver 20 determines whether to receive information about an RS transmission pattern from the transmitter 10 (702). For example, the transmitter 10 transmits information about patterns, transmitted through the antennas and antenna ports, to the receiver 20. As an example, the pattern information is implemented as shown in FIG. 5.

When the receiver 20 ascertains that it receives information about an RS transmission pattern in operation 702, it stores the received information about an RS transmission pattern (704). The receiver 20 can include a built-in memory. The built-in memory of the receiver 20 can secure an area for storing information about RS transmission patterns.

In contrast, when the receiver 20 ascertains that it does not receive information about an RS transmission pattern in operation 702, it determines whether to receive an RS (710).

When the receiver 20 ascertains that it does not receive an RS in operation 710, it returns to operation 700. In contrast, when the receiver 20 ascertains that it receives an RS in operation 710, it determines whether to receive RSs of all the patterns (712). As shown in FIG. 3, when the transmitter 10 transmits K patterns, i.e., first pattern 211 to K-th pattern 21K, to the receiver 20, the receiver 20 receives the K patterns and performs channel estimation 230.

When the receiver 20 has not received RSs of all the patterns in operation 712, it stores RSs in the buffer that it has received (714) and returns to operation 700. For example, if the number of patterns is K (an integer) and the receiver 20 receives one or more patterns of first pattern 211 to K-th pattern 21K, the receiver 20 stores RSs in the buffer that it has received. That is, the receiver 20 stores patterns as it receives in the built-in memory or butter until it has received all patterns, namely, K patterns.

In contrast, when the receiver 20 has received RSs of all the patterns, namely, K patterns, in operation 712, the receiver 20 estimates channels by respective antennas by using all the received patterns (716). This is described as follows referring to Equation 1.

As expressed in Equation 1, the transmitter 10 has already received and stored the rule for mapping signals in operation 704. Therefore, matrix V in Equation 1 has been known. Matrix g of received signals is obtains from signals of all the patterns. Since information about the number of antennas of the transmitter 10 can be obtained from the received pattern information, matrix h is calculated by multiplying determinant of matrix g by inverse matrix V calculated from Equation 1. The calculated matrix g is channel estimation information by respective antennas. Therefore, the channel estimation information of operation 716 can be calculated by Equation 1.

The receiver 20 determines gains of channels by using channel estimation values by respective antennas, calculated in operation 716, and updates the respective channels based on the determined gains (718). The receiver 20 obtains data complying with the gains according to the data that the transmitter 10 transmitted through respective channels. For example, when the receiver 20 receives data from the transmitter 10, it multiplies the data by corresponding gains of respective channels and decodes the data multiplied by gains.

As described above, the apparatus and method according to the present disclosure can efficiently transmit and receive a Reference Signal (RS) for channel estimation, and increase the efficiency of resources in a wireless communication system using Multiple-Input and Multiple-Output (MIMO). In addition, the apparatus and method can increase the efficiency of resources and perform precise channel estimation in a wireless communication system using MIMO.

As described above, one skilled in the art will understand that the embodiments disclosed in the description and configurations illustrated in the drawings are only preferred embodiments, instead there may be various modifications, alterations, and equivalents thereof to replace the embodiments at the time of filing this application.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of transmitting Reference Signals (RSs) in a wireless communication system using Multiple Input Multiple Output (MIMO), comprising:
   determining a number of antennas to transmit RSs and a number of antenna ports, wherein each antenna port includes one or more antennas;
   determining a number of patterns to transmit the RSs;
   determining a number of transmissions of the RSs based on the number of antennas and the determined number of antenna ports, wherein the determined number of patterns to transmit the RSs is equivalent to the determined number of transmissions of the RSs;
   creating different transmit patterns that cyclically differ from each other over a period of time, wherein each transmit pattern, of the created transmit patterns, is provided to one antenna port of the number of antenna ports;
   mapping the RSs to the one or more antennas according to the created transmit patterns for each antenna port; and
   transmitting the RSs based on an order the RSs are mapped to the one or more antennas.

2. The method of claim 1, wherein:
   one period of the period of time is an interval of time to transmit all the RSs through the different transmit patterns; and
   the different transmit patterns are configured based on a number of antennas transmitting the RSs at a time point L and a number of antennas transmitting the RSs at a time point L+1 are equal to each other within the one period.

3. The method of claim 1, further comprising:
   detecting a receiver does not process RSs that are arranged in a cycle of the different transmit patterns;
   determining whether to use a transmission mode that estimates results of RSs from the receiver; and
   in response to determining the transmission mode is not used, creating a mode setting signal without using a feedback from the receiver; and
   transmitting the mode setting signal.

4. The method of claim 3, further comprising:
   detecting a Long Term Evolution (LTE) base station, in response to detecting the LTE base station using a transmit diversity mode or an open-loop MIMO mode.

5. The method of claim 1, further comprising:
   detecting a receiver;
   determining whether a mode is used that estimates results of RSs from the receiver; and
   in response to determining the mode is used, transmitting another set of RSs to the receiver at a preset unit of time.

6. The method of claim 5, wherein:
   one period of the period of time is an interval of time to transmit all the RSs through the different transmit patterns; and
   when one period during which the different transmit patterns are transmitted has elapsed, transmitting the another set of RSs to the receiver.

7. The method of claim 1, further comprising:
   informing a receiver of pattern information about the RSs mapped to each of the one or more antennas.

8. The method of claim 1, further comprising creating the RSs by one or more RS creating ports.

9. The method of claim 8, wherein mapping the created RSs to the one or more antennas comprises:
   mapping the created RSs by the one or more RS creating ports to one or more Transceiver Units (TXRUs); and
   mapping the RSs mapped in TXRU to the one or more antennas.

10. A transmitter for transmitting Reference Signals (RSs) in a wireless communication system using Multiple Input Multiple Output (MIMO), comprising:
    an antenna unit including two or more antenna ports, each antenna port comprising one or more antennas;
    an RS creating unit configured to create RSs of different patterns, wherein a number patterns corresponds to the two or more antenna ports;
    a virtual antenna mapping unit (VAM) configured to map and output the RSs, output from the RS creating unit, to the one or more antennas, respectively; and
    a mapping signal creating unit configured to:
      determine a number of antennas to transmit RSs and a number of antenna ports of the two or more antenna ports,
      determine a number of patterns to transmit the RSs,
      determine a number of transmissions of the RSs based on the number of antennas and the determined number of antenna ports, wherein the determined number of patterns to transmit the RSs is equivalent to the determined number of transmissions of the RSs,
      create different transmit patterns that cyclically differ from each other over a period of time, wherein each transmit pattern, of the created transmit patterns, is provided to one antenna port of the number of antenna ports,
      map the RSs to the one or more antennas according to the created transmit patterns for each antenna port, and
      transmit the RSs based on an order the RSs are mapped to the one or more antennas.

11. The transmitter of claim 10, wherein:
    one period of the period of time is an interval of time to transmit all the RSs through the different transmit patterns; and
    the different transmit patterns are configured based on a number of antennas transmitting the RSs at a time point L and a number of antennas transmitting the RSs at a time point L+1 are equal to each other within the one period.

12. The transmitter of claim 10, wherein, when a receiver that does not process the RSs that are arranged in a cyclic pattern, is detected, the mapping signal creating unit is configured to:
    create a mode setting signal without using a feedback from the receiver; and
    transmit the mode setting signal,
    wherein the mode setting signal estimates results of the RSs from the receiver.

13. The transmitter of claim 12, wherein, when the transmitter is a base station of a Long Term Evolution (LTE) system, the mode setting signal is a transmit diversity mode or an open-loop MIMO mode.

14. The transmitter of claim 10, wherein, when a receiver that does not process RSs arranged in a cyclic patter, is detected, the mapping signal creating unit is configured to transmit another set of RSs to the receiver at a preset unit of time based on a determined mode, wherein the determined mode estimates results of the RSs from the receiver.

15. The transmitter of claim 14, wherein:
    one period of the period of time is an interval of time to transmit all the RSs through the different transmit patterns; and
    when one period during which the different transmit patterns are transmitted has elapsed, the mapping signal creating unit is configured to transmit the other set of RSs to the receiver.

16. The transmitter of claim 10, further comprising:
    a controller configured to transmit pattern information about the RSs mapped to each of the one or more antennas to a receiver.

17. The transmitter of claim 10, wherein the mapping signal creating unit comprises:
    an antenna port virtualizing unit configured to map the RSs that are created by one or more RS creating ports to one or more Transceiver Units (TXRUs); and
    TXRU virtualizing unit configured to map the RSs mapped in TXRU to the one or more antennas.

18. A method of estimating a channel by using received Reference Signals (RSs) in a receiver of a wireless communication system using Multiple Input Multiple Output (MIMO) comprising:
    receiving, transmit pattern information about the RSs from a transmitter with two or more antenna ports, wherein each antenna port includes one or more antennas;
    receiving RSs of different patterns corresponding to a determined number of transmissions according to the received transmit pattern information from the transmitter, wherein each transmit pattern is cyclically different from each other, wherein the transmit pattern information indicates a number of the antenna ports and a number of antennas of the transmitter, and wherein the determined number of transmissions is based on the number of antennas of the transmitter to the number of the antenna ports of the transmitter, wherein the patterns are equivalent to the determined number of transmissions; and
    estimating, when patterns of a preset number of transmission are received, channels based on the received RSs of different patterns and the received transmit pattern information.

19. The method of claim 18, wherein receiving the RSs comprises:
    determining whether the RSs are received a number of times based on the determined number of transmissions; and storing, when the RSs are not received the determined number of transmission times, the RSs that are received.

20. The method of claim 18, further comprising:

determining channel gains corresponding to the estimated channels.

* * * * *